United States Patent Office 2,745,829
Patented May 15, 1956

2,745,829

PREPARATION OF 3-HYDROXY-11-KETOCHOLANIC ACID, DERIVATIVES AND ANALOGS THEREOF, AND INTERMEDIATES IN SAID PREPARATION

Sydney Archer, Albany, N. Y., assignor to Sterling Drug Inc., New York, N. Y., a corporation of Delaware No Drawing. Application March 25, 1954,
Serial No. 418,779

18 Claims. (Cl. 260—239.5)

This invention relates to improvements in the process for introducing an 11-oxygen atom into the steroid molecule and to new intermediates therefor. In particular the invention relates to improvements in the process for preparing 3-hydroxy-11-ketocholanic acid, its side chain lower homologs and esters thereof, and to intermediates in said preparation, namely, the 12-(1,3-propanedithiol) mercaptole of 3-hydroxy-11,12-diketocholanic acid, its side chain lower homologs and esters thereof.

3-hydroxy-11-ketocholanic acid and the corresponding norcholanic and bisnorcholanic acids are useful in the production of adrenocortical hormones such as cortisone [Fieser and Fieser, Natural Products Related to Phenanthrene, 3rd edition (Rheinhold Publishing Co. 1949), pages 429–465].

A preferred sequence of reactions for carrying out my invention is set forth in the following flow sheet. In the structural formulas $n$ is a whole number from 0 to 2, and R is a lower-alkyl group.

A compound of structure I is obtained by known procedures from readily available starting materials. For example, desoxycholic acid or a side chain lower homolog thereof is selectively esterified in the 3-position, for example with succinic anhydride to give the acid succinate, the 12-hydroxy group is then oxidized to a 12-keto group, and the resulting compound is brominated in position 11.

Hydrolysis of a compound of structure I under alkaline conditions followed by neutralization of the reaction mixture with mineral acid gives a mixture of compounds of structure II. The positions of the hydroxyl and keto groups and the orientation of the hydroxyl groups in ring C in the compounds of structure II actually isolated depend upon the conditions employed during the hydrolysis. If the method of Hershberg et al., J. Am. Chem. Soc. 74, 2585 (1952), is used, i. e., heating the bromo ketone (I) with sodium hydroxide in dilute methanol, a mixture of all four possible isomers of structure II is obtained.

An advantage of the present invention is that the position and orientation of the groups in ring C of structure II is immaterial since all possible isomers are subsequently converted to the same compound in the oxidation step. Consequently all isomers can be used and it is not necessary to separate mixtures of compounds of structure II before proceeding.

Before proceeding with further transformations in the steroid nucleus it is desirable to protect the carboxyl group and the 3-hydroxy group against attack by reagents used in the subsequent oxidation and mercaptolization reactions. This is accomplished by esterification of a compound of structure II by first treating it with a lower-alkanol in the presence of a strong acid such as hydrogen chloride, and then with formic acid. A lower-alkyl ester

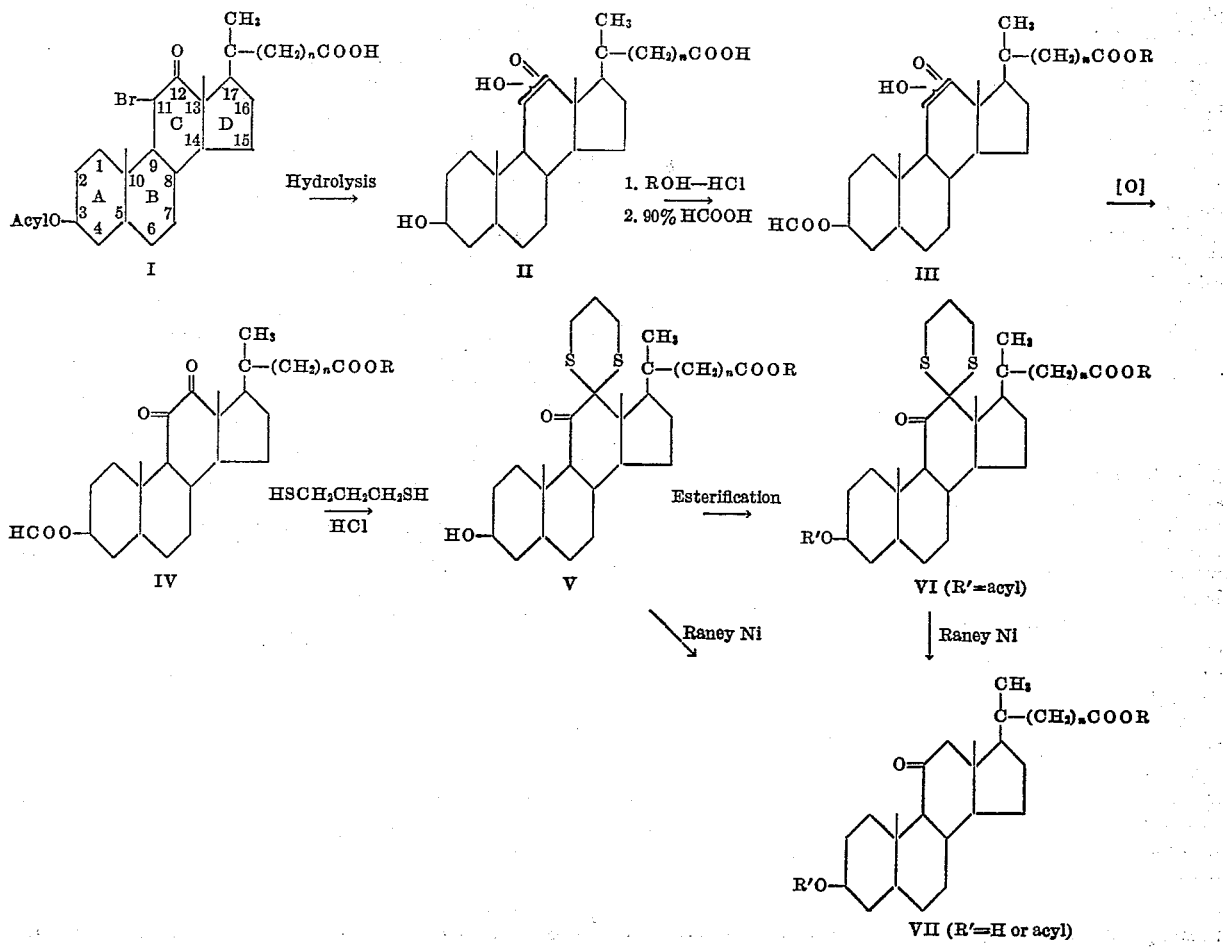

of the carboxyl group is formed and the 3-hydroxy group is converted to the formate. The formic acid ester is most conveniently used as a means for blocking the 3-hydroxy group in this instance because it is the ester most readily produced selectively without similar esterification of the hydroxy group in ring C.

The lower-alkanol used to esterify the carboxyl group can be any of the lower-alkanols having from 1 to about 4 carbon atoms, thus including methanol, ethanol, 1-propanol, 2-propanol, 1-butanol and the various branched chain butanols. Accordingly the group R in the above flow sheet can be methyl, ethyl, propyl, isopropyl, butyl, or the various branched chain butyl groups.

The compound of structure III thus produced is then oxidized to a 3-formoxy-11,12-diketocholanic acid ester or lower-homolog thereof (IV). The oxidizing agents used are those conventionally employed to oxidize steroid hydroxy groups to steroid keto groups. Such agents include chromic oxide, sodium or potassium chromate and N-bromosuccinimide.

The structure IV is then converted to the 12-(1,3-propanedithiol) mercaptole (V) by treating the 11,12-diketo compound with 1,3-propanedithiol in the presence of a strong acid such as hydrogen chloride under essentially anhydrous conditions. During the reaction the 3-formoxy group is also cleaved to a large extent either by the water produced by the reaction, or by alcoholysis by the action of excess dithiol or an alcohol which may be present as a solvent. To obtain the best yields it is desirable to observe the following precautions: a lower-alkanol such as methanol is added to the reaction mixture to aid in the complete solvolysis of the formoxy group and thus prevent production of mixtures. Prompt removal of formic acid and derivatives thereof from the reaction mixture is effected to prevent formation of by-products produced by the reaction of formic acid and its derivatives with 1,3-propanediol. The reaction takes place readily at room temperature or below.

Although it is most convenient to use the 11,12-diketo compound as the 3-formate in the mercaptolization reaction, it is not prerequisite that the 3-hydroxy group be in the form of the formate ester. If desired the 11,12-diketo compound can be used in the form of 3-esters derived from any desired carboxylic acid. These can be prepared by oxidation of compounds analogous to structure III but bearing different acyloxy groups in the 3-position, or, alternatively, the structure IV can be selectively saponified, for example, by heating with dilute mineral acid, and then reesterified to introduce any desired acyl group by heating with the appropriate acid anhydride or acid halide.

The mercaptole esters (V, R=lower-alkyl; or VI, R=lower-alkyl, R'=acyl) can be saponified to the free acid (V, R=H) by mild alkaline hydrolysis.

To obtain the desired 11-keto steroid (VII), the mercaptole derivative (V) or an ester thereof (VI) is treated in an inert solvent with Raney nickel which cleaves the entire mercaptole ring leaving the 12-position unsubstituted. The reaction takes place readily at room temperature although heating may be used if desired. In this manner there is produced an alkyl 3-hydroxy-11-ketocholanate (R'=H) or lower homolog thereof, or an ester thereof (R'=acyl). It is preferred to esterify V before carrying out the desulfurization reaction because the final product is more easily crystallized as an ester (VII, R'=acyl) than as the free alcohol (VII, R'=H).

The nature of the acyl group in compounds VI and VII is not critical, although esters derived from carboxylic acids having from 1 to about 8 carbon atoms are preferred, in particular esters of lower-alkanoic acids, such as the formate, acetate, propionate, valerate, isovalerate, etc.; half esters of lower-alkanedicarboxylic acids, such as the acid succinate, acid glutarate, acid adipate, etc.; esters of monocyclic aromatic carboxylic acids such as the benzoate, p-nitrobenzoate, p-toluate, etc.; and mixed esters of carbonic acid (R'=alkyl—O—CO—O—). The esters are prepared by conventional procedures from the steroid alcohol by reacting the latter with the appropriate acid, acid anhydride or acid halide.

The following examples will further illustrate the invention.

EXAMPLE 2

(a) *Methyl 3α-formoxy-11,12-diketocholanate (IV, n=2)*

1. FROM "MIXED ACIDS" (II, n=2) USING CHROMIC OXIDE

Fifty-three grams of 3α-succinoxy-11α-bromo-12-ketocholanic acid (I, n=2, Acyl=HOOCCH$_2$CH$_2$CO—) was hydrolyzed by the Hershberg (loc. cit.) method, and the resulting "mixed acids" (II, n=2) were dissolved in 400 ml. of 1% methanolic hydrogen chloride. After 18 hours the acid was neutralized with 4.0 g. of sodium bicarbonate, the inorganic material removed by filtration and the filtrate evaporated to dryness. The residue was warmed to 65° C. with 125 ml. of 90% formic acid and set aside for three hours. The solution was diluted with water and then was extracted with chloroform. The organic layer was washed with dilute sodium bicarbonate solution and finally with water before being taken to dryness in vacuo. The residue, containing compounds of structure III (n=2, R=CH$_3$), was dissolved in 270 ml. of acetic acid and stirred at 24° C. while a solution of 7.5 g. of chromic oxide in 10 ml. of water was added dropwise. Stirring was continued for another hour during which time the product started to separate from solution. The suspension was diluted carefully with an equal volume of water. The crude diketoformate (34.0 g.) was collected, washed well with water and dried. The crude ester was recrystallized from aqueous formic acid to furnish 22.83 g. of methyl 3α-formoxy-11,12-diketocholanate, M. P. 192–200° C. (overall yield, 55%). The highest melting material was obtained by repeated leaching of the above product with boiling methanol. The specimen thus obtained melted at 208–211° C. $[\alpha]_D^{25} = +124°$.

*Analysis.*—Calcd. for C$_{26}$H$_{36}$O$_6$: C, 69.92; H, 8.58. Found: C, 69.92; H, 8.69.

The methanol leachings furnished two substances. One of these, M. P. 140.5–145.5° C. was probably impure methyl 3α-formoxy-11-hydroxy-12-keto-Δ$^{9,11}$-cholenate. The other, M. P. 172–174° C. did not depress the M. P. of authentic methyl 3α-formoxy-11β-hydroxy-12-ketocholanate.

2. FROM "MIXED ACIDS" USING POTASSIUM CHROMATE

A quantity of 19.2 g. of the "mixed acids" (II), obtained by hydrolysis of 3α-succinoxy-11α-bromo-12-ketocholanic acid by the Hershberg (loc. cit.) method, was esterified and formylated in the manner described in part a-1 above to afford a syrup which was dissolved in 816 ml. of acetic acid, warmed to 65° C. and treated with 14 g. of potassium chromate in 37 ml. of water. After one hour the mixture was diluted with five volumes of water and the product was collected by filtration. The product was leached with hot methanol, and there was obtained 13.5 g. of methyl 3α-formoxy-11,12-diketocholanate, M. P. 193–201° C. (64% overall).

(b) *Methyl 3α-hydroxy-11,12-diketocholanate 12-(1,3-propanedithiol) mercaptole (V, n=2, R=CH$_3$)*

A slow stream of dry hydrogen chloride was passed through a cold solution of 1.0 g. of methyl 3α-formoxy-11,12-diketocholanate in 4 ml. of toluene and 3 ml. of 1,3-propanedithiol for two hours. The volatile material was removed in vacuo and the residual oil was leached repeatedly with ligroin until the insoluble material turned crystalline; wt. 250 mg., M. P. 154–160° C. On cooling the ligroin extracts deposited 400 mg. of crystals, M. P. 161–163° C. The two crops were combined and recrystallized from a large volume of ligroin, giving methyl 3α-hydroxy-11,12-diketocholanate 12-(1,3-propanedithiol)

mercaptole, M. P. 163–164° C. When recrystallized from isopropyl alcohol it separated as a solvate which melted at 93–95° C., resolidified and then melted at 159–160° C. The solvate gave the following analytical figures.

*Analysis.*—Calcd. for $C_{28}H_{42}O_4S_2.1\ C_3H_8O$: S, 11.28; loss of solvent of crystallization at 100°, 10.6. Found: S, 11.30; loss of solvent of crystallization at 100°, 11.2.

The solvent-free compound, $[\alpha]_D^{25} = -30.4°$, was analyzed.

*Analysis.*—Calcd. for $C_{28}H_{42}O_4S_2$: C, 66.36; H, 8.36; S, 12.65. Found: C, 66.53; H, 8.61; S, 12.62.

When the above reaction mixture was subjected directly to chromatography on alumina and the column eluted with benzene-chloroform mixtures the early eluate fractions yielded crystalline material, M. P. 172–174° C. after recrystallization first from methanol and then ligroin. This proved to be methyl 3α-formoxy-11,12-diketocholanate 12-(1,3-propanedithiol) mercaptole (VI, $n=2$, R=CH₃, R'=HCO), $[\alpha]_D^{20} = -25.9°$.

*Analysis.*—Calcd. for $C_{29}H_{42}O_5S_2$: C, 64.89; H, 8.26; S, 11.95. Found: C, 65.20; H, 8.19; S, 11.92.

The formate was also obtained by recrystallizing the 3-hydroxy compound from formic acid.

The preferred procedure for the preparation of methyl 3α-hydroxy-11,12-diketocholanate 12-(1,3-propanedithiol) mercaptole is as follows. A suspension of 7.5 g. of methyl 3α-formoxy-11,12-diketocholanate (purified by a methanol slurry) in 35 ml. of 9 N methanolic hydrogen chloride was stirred and cooled. Dry hydrogen chloride was passed through the solution for one hour and after two hours the condenser was removed while dry nitrogen was bubbled through to sweep out methyl formate. The solution was re-saturated with hydrogen chloride at 5° C. and then 3.7 ml. of 1,3-propanedithiol was added in one portion. The hydrogen chloride stream was maintained for an additional hour. The reaction mixture was allowed to stand for two hours while the ice-bath melted and the temperature rose to 20° C. The red solution was then poured into ice-water. The mixture was extracted with ether and the ethereal solution was washed successively with water, dilute sodium bicarbonate and again with water before being concentrated to dryness. The residue was heated on the steam-bath at 0.5 mm. for two hours. During this time it solidified. The material was crystallized from isopropyl alcohol. The first crop, wt. 7.32 g., melted at 91–95° C., resolidified and melted at 156–158° C. The second crop which was slightly less pure amounted to 510 mg. The total yield of solvated mercaptole was 82% of the theoretical.

EXAMPLE 2

*Methyl 3α-acetoxy-11,12-diketocholanate 12 - (1,3 - propanedithiol) mercaptole (VI, $n=2$, R=CH₃, R'=CH₃CO)*

Seven grams of methyl 3α-hydroxy-11,12-diketocholanate 12-(1,3-propanedithiol) mercaptole obtained in 82% yield as described by the preferred procedure in Example 1 above was dissolved in benzene and concentrated to dryness to remove the isopropyl alcohol of crystallization. The residue was dissolved in pyridine and treated with 7 ml. of acetic anhydride. The next day the solution was poured into water and set aside for several hours. The crystals were collected and then recrystallized from aqueous acetone to furnish 5.90 g. of methyl 3α-acetoxy-11,12-diketocholanate 12-(1,3-propanedithiol) mercaptole, M. P. 216–218° C. (yield, 88%). Further crystallization from acetone raised the M. P. to 221–222° C.; $[\alpha]_D^{25} = -22.4°$.

*Analysis.*—Calcd. for $C_{30}H_{44}O_5S_2$: C, 65.65; H, 8.08; S, 11.68. Found: C, 65.72; H, 8.27; S, 11.86.

EXAMPLE 3

*Methyl 3α-carboethoxyoxy-11,12-diketocholanate 12-(1,3-propanedithiol) mercaptole (VI, $n=2$, R=CH₃, R'=C₂H₅O—CO—)*

Ten grams of methyl 3α-hydroxy-11,12-diketocholanate 12-(1,3-propanedithiol) mercaptole was dissolved in pyridine and then treated with an equal weight of ethyl chlorocarbonate. The methyl 3α-carboethoxyoxy-11,12-diketocholanate 12-(1,3-propanedithiol) mercaptole thus obtained was purified by recrystallization from acetone; M. P. 161–163.5° C. $[\alpha]_D^{25} = -8°$.

*Analysis.*—Calcd. for $C_{31}H_{46}O_6S_2$: C, 64.10; H, 8.33. Found: C, 64.20; H, 8.24.

EXAMPLE 4

*3α-hydroxy-11,12-diketocholanic acid 12-(1,3-propanedithiol) mercaptole (V, $n=2$, R=H)*

1,3-propanedithiol (5 ml.) was added to a suspension of 5.0 g. of methyl 3α-formoxy-11,12-diketocholanate suspended in 10 ml. of benzene, and hydrogen chloride gas was passed through the mixture while cooled with an ice-bath. After five minutes the reaction mixture was allowed to warm to room temperature, and addition of hydrogen chloride was continued for one hour. The reaction mixture was then poured into sodium bicarbonate solution and steam distilled. Methanol was added to the oily residue and distillation continued. An excess of sodium hydroxide was added and the mixture allowed to stand overnight and then boiled for one hour, replacing the methanol with water. The mixture was diluted to a 1 liter volume, cooled to 15° C. and filtered. The filtrate was acidified with acetic acid, and the precipitate which formed was collected by filtration, dried at 70° C. and recrystallized from methanol, removing some insoluble gum. There was thus obtained 1 g. of 3α-hydroxy-11,12-diketocholanic acid 12-(1,3-propanedithiol) mercaptole, M. P. 202–205° C. When recrystallized from benzene it had the M. P. 209–212° C.

EXAMPLE 5

*Methyl 3α-acetoxy-11-ketocholanate (VII, $n=2$, R=CH₃, R'=CH₃CO)*

Two grams of pure methyl 3α-acetoxy-11,12-diketocholanate 12-(1,3-propanedithiol) mercaptole, prepared as described above in Example 2, was suspended in 100 ml. of methanol which contained 10 g. of wet Raney nickel catalyst. The mixture was shaken mechanically for six hours. After the catalyst was removed the filtrate was evaporated to dryness and the residue was recrystallized from dilute acetone to furnish 1.54 g. of methyl 3α-acetoxy-11-ketocholanate (yield, 95%); M. P. 131–133° C. One further crystallization raised the M. P. to 133–134° C. $[\alpha]_D^{25} = +70°$.

*Analysis.*—Calcd. for $C_{27}H_{42}O_5$: C, 72.61; H, 9.48. Found: C, 72.89; H, 9.40.

When the reaction was carried out in refluxing methanol for one hour the yield was 90% of methyl 3α-acetoxy-11-ketocholanate, after recrystallization. When carried out at room temperature but for only fifteen minutes the reaction mixture gave the desired methyl 3α-acetoxy-11-ketocholanate, M. P. 131–132.5° C. in 86% yield.

EXAMPLE 6

*Methyl 3α-formoxy-11-ketocholanate (VII, $n=2$, R=CH₃, R'=HCO)*

The solvated methyl 3α-hydroxy-11,12-diketocholanate 12-(1,3-propanedithiol) mercaptole (2.0 g.), prepared as described above in Example 1, was refluxed in 50 ml. of methanol in which there was suspended 5.0 g. of moist Raney nickel catalyst. After four hours the catalyst was filtered off and the solvent was removed leaving a residue which solidified on cooling. The latter, which comprised methyl 3α-hydroxy-11-ketocholanate, was warmed with 15 ml. of 90% formic acid for one-half hour. The diluted reaction mixture yielded an oil which solidified when triturated with methanol; wt. 1.25 g. After three recrystallizations from acetone the methyl 3α-formoxy-11-ketocholanate thus obtained melted at 139.5–140.5° C.

EXAMPLE 7

*Methyl 3α-carboethoxyoxy-11-ketocholanate (VII, n=2, R=CH₃, R'=C₂H₅O—CO—O)*

Three grams of methyl 3α-carboethoxyoxy-11,12-diketocholanate 12-(1,3-propanedithiol) mercaptole, prepared as described above in Example 3, and 10 g. of Raney nickel catalyst were boiled in methanol overnight. The mixture was worked up in the usual way to furnish 1.50 g. of methyl 3α-carboethoxyoxy-11-ketocholanate by recrystallization from acetone. After another recrystallization from acetone and then methanol the desired compound melted at 146–147.5° C.

*Analysis.*—Calcd. for $C_{28}H_{42}O_6$: C, 70.85; H, 8.92. Found: C, 70.37; H, 9.11.

The 3α-hydroxy-11,12-diketocholanic acid 12-(1,3-propanedithiol) mercaptole obtained above in Example 4 can be desulfurized with Raney nickel to give 3α-hydroxy-11-ketocholanic acid.

Methyl 3α-hydroxy-11,12-diketocholanate 12-(1,3-propanedithiol) mercaptole can be reacted with propionic anhydride, succinic anhydride or benzoyl chloride to produce, respectively, methyl 3α-propionoxy-11,12-diketocholanate 12-(1,3-propanedithiol) mercaptole, methyl 3α-(β-carboxypropionoxy) 12-(1,3-propanedithiol) mercaptole, or methyl 3α-benzoyloxy-11,12-diketocholanate 12-(1,3-propanedithiol) mercaptole. These compounds can be desulfurized with Raney nickel by the procedure described above to produce the corresponding esters of methyl 3-hydroxy-11-ketocholanate.

Nordesoxycholic acid or bisnordesoxycholic acid can be acylated at the 3-position, oxidized and brominated to give 3-acyloxy-11-bromo-12-ketonorcholanic acid (I, n=1) or 3-acyloxy-11-bromo-12-ketobisnorcholanic acid (I, n=0). The latter compounds can be carried through the same series of reactions described in the examples above to produce a lower-alkyl 3α-hydroxy-11,12-diketonorcholanate 12-(1,3-propanedithiol) mercaptole (V, n=1) or a lower-alkyl 3α-hydroxy-11,12-diketobisnorcholanate 12-(1,3-propanedithiol) mercaptole (V, n=0), or esters thereof. The latter mercaptoles can then be desulfurized with Raney nickel to produce a lower-alkyl 3α-hydroxy-11-ketonorcholanate (VII, n=1) or a lower-alkyl 3α-hydroxy-11-ketobisnorcholanate (VII, n=0), or esters thereof.

I claim:

1. A compound having the formula

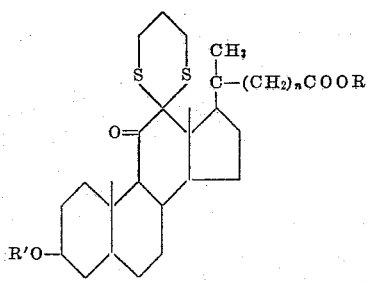

wherein $n$ is a whole number from 0 to 2, R is a member of the class consisting of hydrogen and lower-alkyl groups, and R' is a member of the class consisting of hydrogen and carboxylic acid acyl groups.

2. A compound according to claim 1, in which $n$ is 2, R is a lower-alkyl group, and R' is hydrogen.

3. A compound according to claim 1 in which $n$ is 2, R is a lower-alkyl group, and R' is a carboxylic acid acyl group.

4. A compound according to claim 1 in which $n$ is 2, R is a lower-alkyl group, and R' is acetyl.

5. A compound according to claim 1 in which $n$ is 2, R is methyl, and R' is hydrogen.

6. A compound according to claim 1 in which $n$ is 2, R is methyl, and R' is a carboxylic acid acyl group.

7. A compound according to claim 1 in which $n$ is 2, R is methyl, and R' is acetyl.

8. A compound according to claim 1 in which $n$ is 2, R is hydrogen, and R' is hydrogen.

9. A compound according to claim 1 in which $n$ is 2, R is hydrogen, and R' is a carboxylic acid acyl group.

10. A compound according to claim 1 in which $n$ is 2, R is hydrogen, and R' is acetyl.

11. A process for the preparation of a compound having the formula

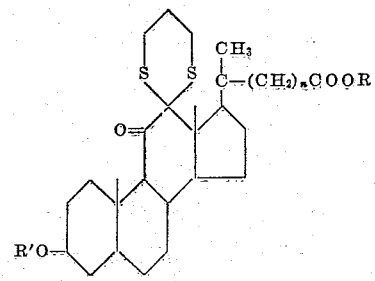

wherein $n$ is a whole number from 0 to 2, R is a lower-alkyl group, and R' is a member of the class consisting of hydrogen and carboxylic acid acyl groups, which comprises treating a compound having the formula

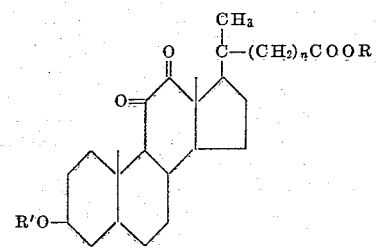

with 1,3-propanedithiol in the presence of a strong acid.

12. The process for the preparation of a compound having the formula

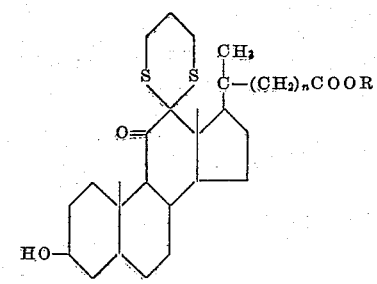

wherein $n$ is a whole number from 0 to 2, and R is a lower-alkyl group, which comprises treating a compound having the formula

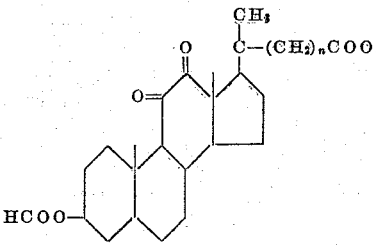

with 1,3-propanedithiol in the presence of a strong acid.

13. A process according to claim 12 wherein $n$ is 2.

14. The process for the preparation of a compound having the formula

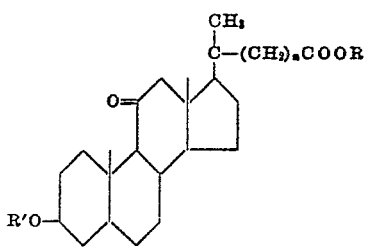

wherein $n$ is a whole number from 0 to 2, R is a member of the class consisting of hydrogen and lower-alkyl groups, and R' is a member of the class consisting of hydrogen and carboxylic acid acyl groups, which comprises treating a solution of a compound having the formula

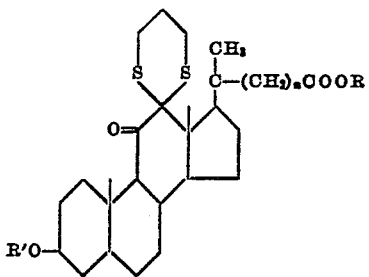

in an inert solvent with Raney nickel.

15. A process according to claim 14 wherein $n$ is 2, and R is a lower-alkyl group.

16. A process according to claim 14 wherein $n$ is 2, R is a lower-alkyl group, and R' is acetyl.

17. A compound according to claim 1 in which $n$ is 2, R is a lower-alkyl group, and R' is formyl.

18. A compound according to claim 1 in which $n$ is 2, R is methyl, and R' is formyl.

References Cited in the file of this patent
UNITED STATES PATENTS
2,447,327    Gallagher _____ Aug. 17, 1948
OTHER REFERENCES
Helv. Chim Acta, vol. 34, pp. 70–82 (1951).
Hauptman: J. Am. Chem. Soc., vol. 69, (1947), pp. 562–66.
Wintersteiner: Chem. Abst., vol. 41, 1947, pp. 145–46.